United States Patent
Rubino et al.

(10) Patent No.: US 7,389,863 B2
(45) Date of Patent: Jun. 24, 2008

(54) AUTOMATICALLY RELEASEABLE BIDIRECTIONAL OVERRUNNING CLUTCH

(75) Inventors: Marcos Thomaz Rubino, Dearborn Heights, MI (US); Jack Eric Pederson, Saline, MI (US); Charles Peterson, Viera, FL (US)

(73) Assignee: Warner Electric Technology, LLC, Quincy, MA (US)

( * ) Notice: Subject to any disclaimer, the term of this patent is extended or adjusted under 35 U.S.C. 154(b) by 245 days.

(21) Appl. No.: 11/341,763

(22) Filed: Jan. 27, 2006

(65) Prior Publication Data

US 2007/0175724 A1   Aug. 2, 2007

(51) Int. Cl.
*F16D 15/00* (2006.01)
*F16D 41/06* (2006.01)

(52) U.S. Cl. .............................. 192/44; 192/38; 192/45; 192/48.92; 74/650

(58) Field of Classification Search ................ 192/38, 192/44, 45, 48.92; 74/650
See application file for complete search history.

(56) References Cited

U.S. PATENT DOCUMENTS

| | | | | |
|---|---|---|---|---|
| 2,865,228 A * | 12/1958 | Weismann | ................... | 74/650 |
| 3,186,473 A | 6/1965 | Myers et al. | | |
| 3,511,348 A | 5/1970 | Jonsson et al. | | |
| 4,766,941 A | 8/1988 | Sloop et al. | | |
| 4,787,491 A * | 11/1988 | Kato | ........................ | 192/48.6 |
| 4,815,515 A * | 3/1989 | Lee | ........................... | 160/23.1 |
| 5,249,616 A | 10/1993 | Yen | | |
| 5,348,126 A * | 9/1994 | Gao | ....................... | 192/223.2 |
| 5,372,173 A * | 12/1994 | Horner | ....................... | 160/98 |
| 5,547,009 A | 8/1996 | Plumer | | |
| 5,735,328 A | 4/1998 | Salhoff et al. | | |
| 5,819,835 A * | 10/1998 | Broome | ..................... | 160/243 |
| 6,427,750 B1 | 8/2002 | Butler | | |
| RE38,012 E | 3/2003 | Ochab et al. | | |
| 6,652,407 B2 | 11/2003 | Ronk et al. | | |
| 6,722,484 B2 | 4/2004 | Ochab et al. | | |
| 6,766,900 B2 | 7/2004 | Kanaris | | |

(Continued)

FOREIGN PATENT DOCUMENTS

DE        878 896        9/1954

(Continued)

OTHER PUBLICATIONS

English Language Abstract of JP 05-171882, JPO and JAPIO (Copyright 1993).

(Continued)

*Primary Examiner*—David D. Le
(74) *Attorney, Agent, or Firm*—Dykema Gossett PLLC

(57) ABSTRACT

The present invention relates to a bi-directional overrunning clutch that enables movement of an object between multiple rotational bodies in either direction using a single motor. The clutch includes a pair of cam discs disposed about a driven shaft extending from the motor and spaced from one another, outer races disposed outwardly of each cam disc and rollers disposed between the cam discs and outer races. The cam discs are oriented such that rotation of the shaft in one rotation direction causes rotation of one outer race and freewheeling of the other outer race while rotation of the shaft in the opposite rotational direction causes rotation of the other outer face and freewheeling of the one outer race.

21 Claims, 3 Drawing Sheets

U.S. PATENT DOCUMENTS

| | | |
|---|---|---|
| 6,805,652 B2 | 10/2004 | Williams |
| 6,846,257 B2 | 1/2005 | Baker et al. |
| 6,846,262 B2 | 1/2005 | Williams et al. |
| 2002/0125097 A1 | 9/2002 | Ochab et al. |

FOREIGN PATENT DOCUMENTS

| | | |
|---|---|---|
| GB | 1 243 730 | 8/1971 |
| JP | 05-171882 | 7/1993 |
| WO | WO 2004/031597 A1 | 4/2004 |

OTHER PUBLICATIONS

International Search Report issued in corresponding international application PCT/US2007/001869 (Aug. 14, 2007).

Written Opinion issued in corresponding international application PCT/US2007/001869 (Aug. 14, 2007).

English language translation of DE 878 896 (column format).

English language translation of DE 878 896 (text format).

* cited by examiner

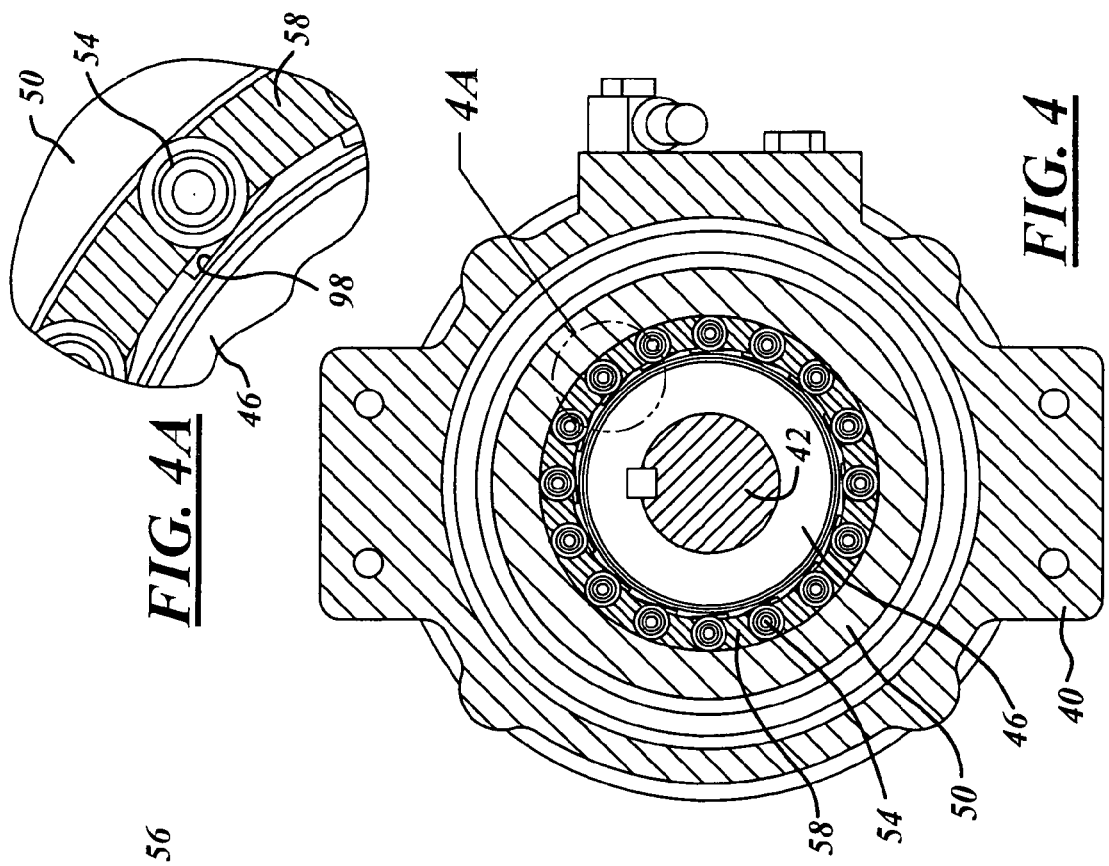
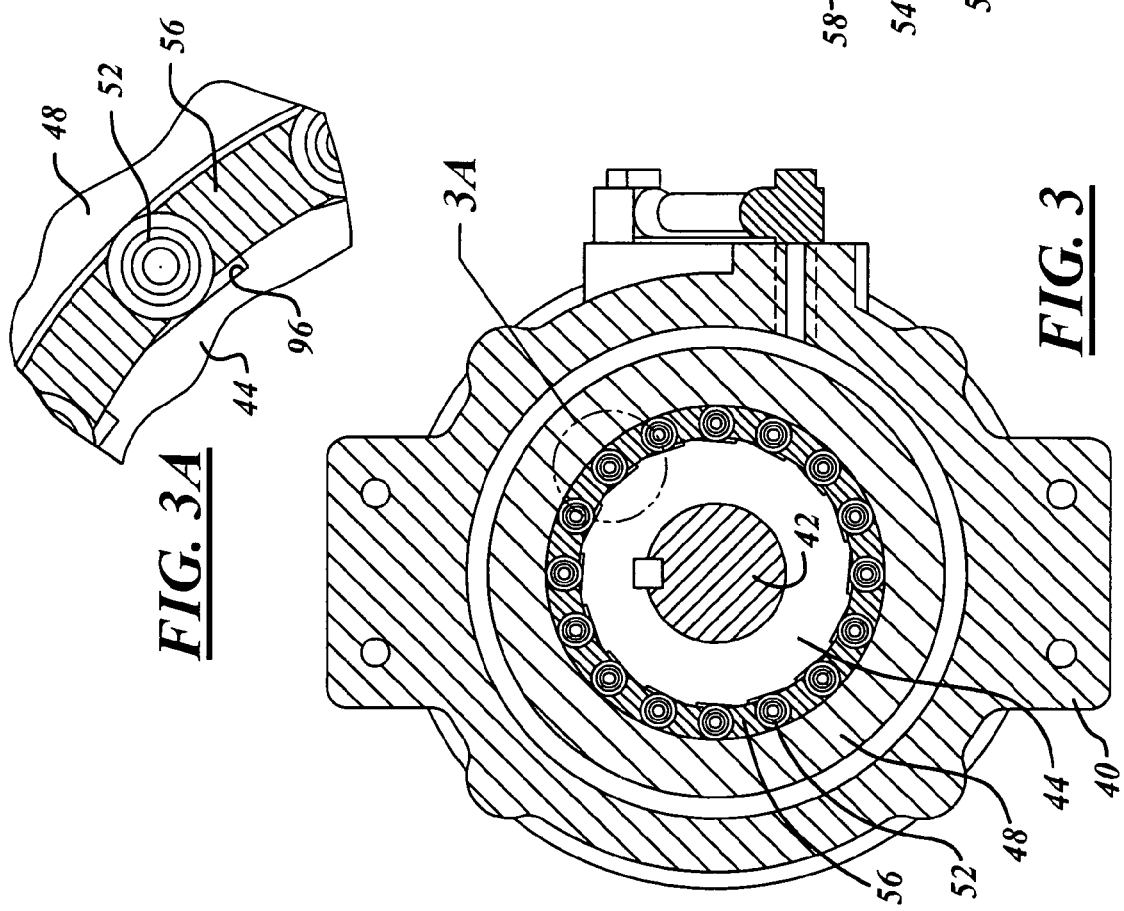

AUTOMATICALLY RELEASEABLE BIDIRECTIONAL OVERRUNNING CLUTCH

BACKGROUND OF THE INVENTION

1. Field of the Invention

This invention relates to a bi-directional overrunning clutch and, in particular, to a bi-directional overrunning clutch having improved performance and structural features that enable the clutch to transfer an object between multiple rotational bodies in either direction in response to torque provided by a single motor.

2. Discussion of Related Art

Rotational coupling devices such as clutches are used to control transfer of torque between rotational bodies. An overrunning clutch is designed to drive in one direction while freewheeling or overrunning in the opposition direction. One of the benefits of an overrunning clutch is that it allows for the overrunning of large inertia loads upon stopping and prevents any back-driving damage that may occur to the drive system. Overrunning clutches are commonly used in applications such as dual motor/engine drives, conveyors belts, creep and starter drives and the disengagement of centrifugal masses.

A bi-directional overrunning clutch is designed to allow designated races of the clutch to freewheel depending on the driving direction of the load. Upon transfer of an object along a conveyor or among various rollers, a bi-directional overrunning clutch allows for the load to move in either direction through the driving and freewheeling rotation of complimentary races. Conventional bi-directional overrunning clutches are used to transfer torque from a single motor to a single load (e.g. a single roller) to move a load in either of two directions.

A variety of systems exist in which there is a need to move an object between two rotational bodies. For example, various industries employ larger rollers to transfer a wound and/or flexible material such as plastic, paper, rubber, other materials used in manufacturing. One example of a consumer application is a weather protection screen for windows in which a protective screen is rolled and unrolled to cover and uncover a window. These conventional systems typically employ separate motors for driving each rotational body and additional structural elements (e.g., reducers). These conventional systems are disadvantageous, however, because the need for individual motors for each rotational body makes the systems expensive and can require undesirable amounts of space.

The inventors herein have recognized a need for a clutch that will minimize and/or eliminate one or more of the above-identified deficiencies.

SUMMARY OF THE INVENTION

The present invention provides a bi-directional overrunning clutch as well as an assembly employing the clutch for moving an object between first and second rotational bodies to which the object is connected.

A bi-directional overrunning clutch in accordance with one aspect of the present invention includes a housing and a driven shaft extending into the housing and disposed about a rotational axis. The clutch further includes a first cam disc disposed about the driven shaft and defining a first inner race, a first outer race disposed about the driven shaft radially outwardly from the first cam disc, and a first plurality of rollers disposed between the first cam disc and the first outer race. The clutch further includes a second cam disc disposed about the driven shaft and defining a second inner race, the second cam disc axially spaced from the first cam disc, a second outer race disposed about the driven shaft radially outwardly from the second cam disc, and a second plurality of rollers disposed between the second cam disc and the second outer race. Rotation of the driven shaft in a first rotational direction causes rotation of the first outer race in the first rotational direction and freewheeling of the second outer race. Rotation of the driven shaft in a second rotational direction, opposite the first rotational direction, causes rotation of the second outer race in the second rotational direction and freewheeling of the first outer race.

In accordance with one aspect of the present invention, the clutch further includes a first cage disposed between the first cam disc and the first outer race that is configured to house the first plurality of rollers and a second cage disposed between the second cam disc and the second outer race that is configured to house the second plurality of rollers. The housing includes a friction member defining first and second friction faces. The first cage is in engagement with the first friction face and the second cage is in engagement with the second friction face.

A bi-directional overrunning clutch in accordance with the present invention represents an improvement over conventional clutches because the clutch is able to transfer an object between multiple rotational bodies in either direction in response to torque provided by a single motor. In particular, the clutch is capable of transferring torque to either of the two rotational bodies responsive to the direction of torque provided by a single bi-directional motor. In this manner, the clutch eliminates the need for multiple motors that transfer materials between multiple rotating bodies thereby reducing the cost and space requirements for such systems.

These and other advantages of this invention will become apparent to one skilled in the art from the following detailed description and the accompanying drawings illustrating features of this invention by way of example.

BRIEF DESCRIPTION OF THE DRAWINGS

FIG. 3 is a cross-sectional view of the clutch of FIG. 2 taken along lines 3-3.

FIG. 3A is an enlarged view of a portion of FIG. 3.

FIG. 4 is a cross-sectional view of the clutch of FIG. 2 taken along lines 4-4.

FIG. 4A is an enlarged view of a portion of FIG. 4.

DETAILED DESCRIPTION OF EMBODIMENTS OF THE INVENTION

Figure 1:
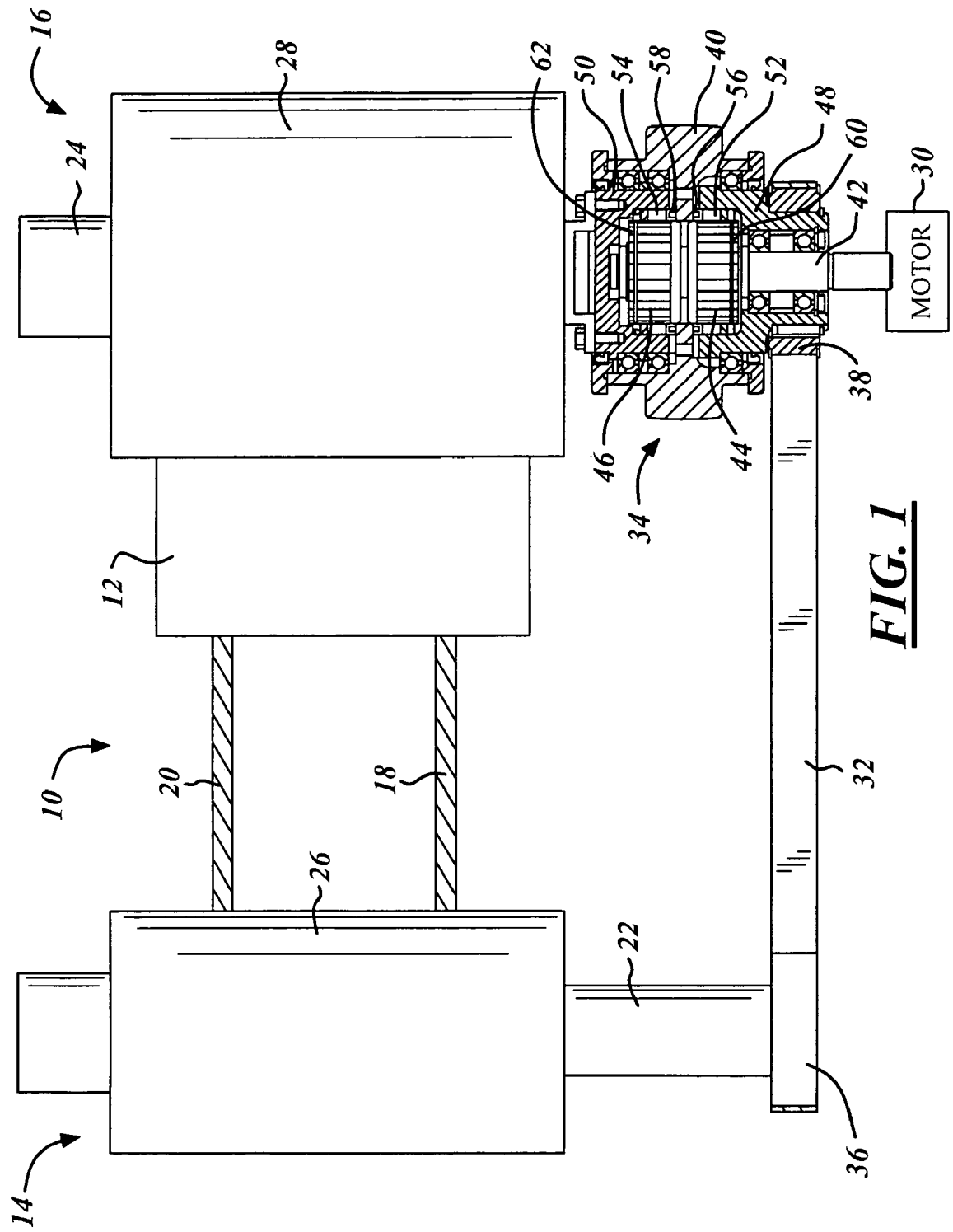
FIG. 1 is a diagrammatic view of an assembly for moving an object between first and second rotational bodies to which said object is connected incorporating a clutch in accordance with the present invention.

Referring now to the drawings wherein like reference numerals are used to identify identical components in the various views, FIG. 1 illustrates an assembly 10 for moving an object 12 between first and second rotational bodies 14, 16 to which the object 12 is connected. The object 12 may comprise a window screen and the assembly 10 may comprise a system for covering and uncovering a window to protect the window from, e.g., the effects of weather events such as hurricanes. Object 12 may be made from a flexible material capable of being rolled onto and off of bodies 14, 16. Object 12 may have one end mounted to one of bodies 14, 16—such as body 16 in the illustrated embodiment—and may have an opposite end connected to the other body—body 14 in the illustrated embodiment—by cables 18, 20 or other attachment means known in the art. Bodies 14, 16 may include shafts 22, 24 about which roller hubs 26, 28 are disposed. Hubs 26, 28 may be sized relative to object 12 and the particular application for which assembly 10 is employed. In accordance with the present invention, assembly 10 may include motor 30, a belt 32, and a bi-directional overrunning clutch 34.

Motor 30 provides torque to each of rotational bodies 14, 16. Motor 30 may comprise a conventional bi-directional motor that is capable of selectively providing torque in either rotational direction.

Belt 32 is provided to transfer torque to rotational body 14. Belt 32 may be disposed about a pair of pulleys 36, 38 mounted on rotational body 14 and clutch 34 as discussed in greater detail hereinbelow. Belt 32 is conventional in the art and may be made from conventional materials such as rubber.

Clutch 34 is provided to selectively transfer rotational torque from motor 30 to either of rotational bodies 14, 16. Clutch 34 is a bi-directional overrunning clutch. Although illustrated for use within an assembly 10 for transferring object 12 between rotational bodies 14, 16, it should be understood that clutch 34 may be used in other applications. In accordance with the present invention, clutch 34 may include a housing 40, a driven shaft 42, cam discs 44, 46, outer races 48, 50, rollers 52, 54, roller cages 56, 58, rings 60, 62 and springs 64, 66 (best shown in FIG. 2).

Figure 2:
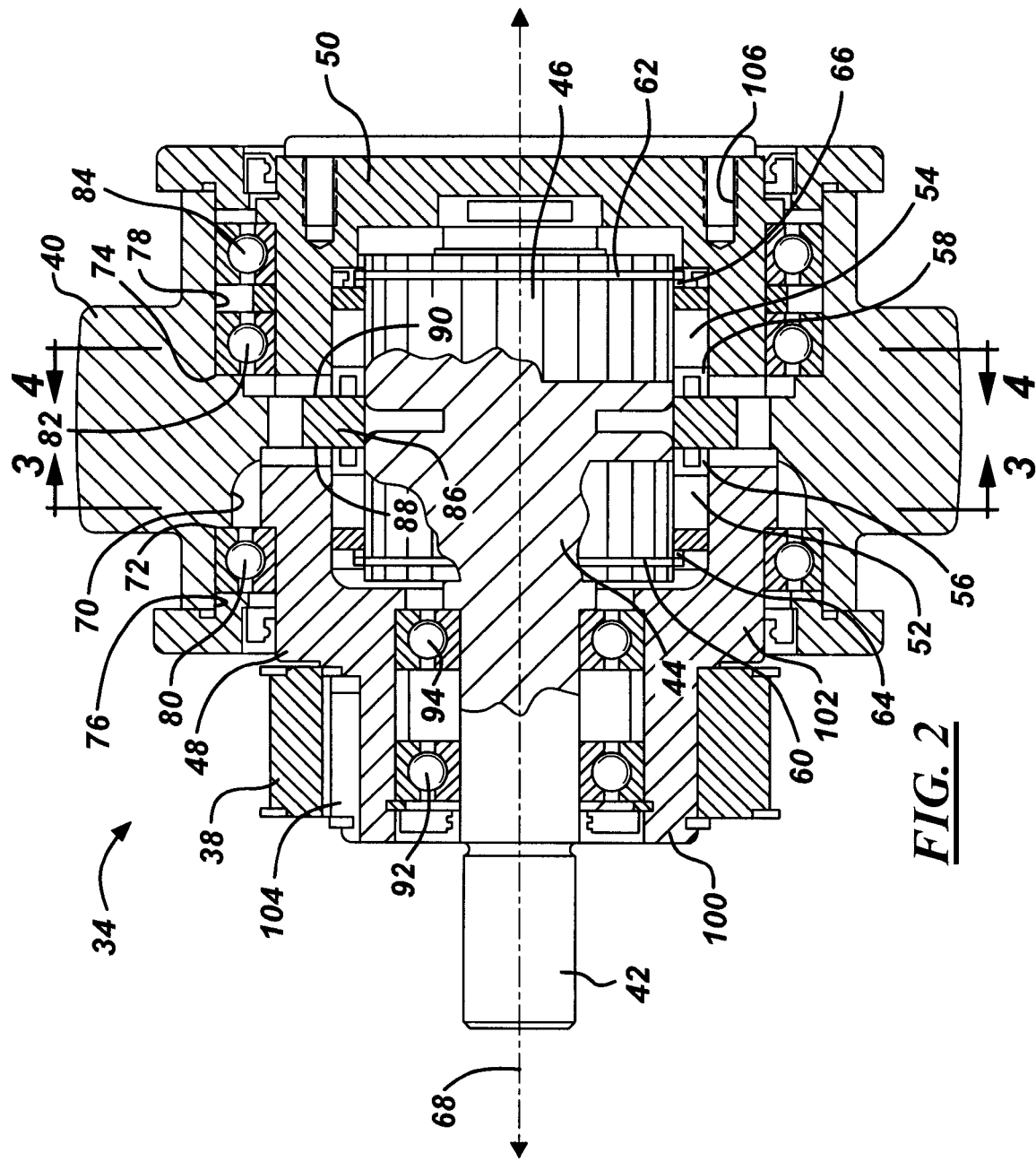
FIG. 2 is a cross-sectional view of a bi-directional overrunning clutch in accordance with one embodiment of the present invention.

Referring now to FIG. 2, housing 40 provides structural support for the other components of clutch 34, protects those components from foreign objects and elements and further provides a means for inhibiting movement of roller cages 56, 58. Housing 40 may be made from conventional metals, metal alloys, or polymeric materials and is fixed against rotation through the use of pins or other fasteners that couple housing 40 to ground or a stationary object. Housing 40 is disposed about an axis 68 and defines an axially extending bore 70. The diameter of bore 70 varies to define shoulders 72, 74 and surfaces 76, 78 sized and shaped to receive bearings 80, 82, 84 that are disposed between housing 40 and outer races 48, 50. In accordance with one aspect of the present invention, housing 40 further defines a friction member 86 in the form of a radially inwardly extending rib. Member 86 is disposed at about the axial midpoint of housing 40 and extends radially inwardly at a distance sufficient to locate member 86 between roller cages 56, 58. Member 86 defines friction faces 88, 90 on either axial side of member 86. Cages 56, 58 are frictionally engaged with faces 88, 90 of member 86 as discussed in greater detail hereinbelow.

Driven shaft 42 provides a source of torque. Shaft 42 is driven by motor 30 and is disposed about rotational axis 68. Shaft 42 extends into bore 70 of housing 40 and is supported within outer race 48 by bearings 92, 94.

Cam discs 44, 46 are provided to shift rollers 52, 54 into an out of engagement with outer races 48, 50. Cam discs 44, 46 are disposed about axis 68 and are supported and driven by shaft 42. Discs 44, 46 are axially spaced from one another. Discs 44, 46 may be integrated into a unitary structure (with or without shaft 42) or may be separate components. Referring to FIGS. 3A and 4A, discs 44, 46 define inner races for rollers 52, 54. Each disc 44, 46 defines a plurality of ramps 96, 98 with each ramp in engagement with a corresponding roller 52, 54. Ramps 96 of disc 44 have an opposite orientation relative to ramps. 98 of disc 46. As a result, rotation of shaft 42 in one direction creates an engagement between one set of rollers 52, 54 with a corresponding outer race 48, 50 and disengagement of the other set of rollers 52, 54 with the corresponding outer race 48, 50. Rotation of shaft 42 in the opposite direction creates the opposite effect.

Referring again to FIG. 2, outer races 48, 50 are provided to transmit torque, directly or indirectly, to rotational bodies 14, 16. Races 48, 50 are disposed about axis 68 and at least portions of races 48, 50 are disposed radially outwardly of cam discs 44, 46, respectively. Races 48, 50 may be made from conventional metals and metal alloys. Race 48 is generally cylindrical in shape with stepped diameter defining portions 100, 102. Portion 100 is configured to receive pulley 38 about which belt 32 is wound in order to transfer torque to pulley 36 and rotational body 14. Portion 100 of race 48 may define a key 104 configured to be received within a corresponding keyway in pulley 38 through which race 48 and pulley 38 are rotationally coupled. It should be understood, however, that pulley 38 may be coupled to race 48 in a variety of ways known in the art. Portion 102 of race 48 is rotationally supported within housing 40 by bearing 80. Portion 102 is disposed outwardly of cam disc 46 and rollers 52. Race 50 is axially spaced from race 48. Race 50 is generally cylindrical in shape and is supported within housing 40 by bearings 82, 84. Race 50 may define one or more apertures 106 configured to receive fasteners through which race 50 may be directly coupled to rotational body 16 to selectively deliver torque to body 16. It should be understood, however, that outer race 50 could be coupled to body 16 in a variety of ways known in the art.

Rollers 52, 54 are provided for selective engagement with outer races 48, 50 to transmit torque to outer races 48, 50. Rollers 52, 54 are conventional in the art and may assume a variety of shapes or sizes depending on the application.

Cages 56, 58 are provided to maintain the position of rollers 52, 54 and to create selective engagement between cam discs 44, 46 and outer races 48, 50 responsive to rotation of shaft 42 and corresponding frictional engagement of cages 56, 58 with friction member 86 of housing 40. Cages 56, 58 define a plurality of cells, each of which is configured to house a corresponding roller 52, 54. Cages 56, 58 are disposed between cam discs 44, 46 and outer races 48, 50 and are centered about axis 68. Cages 56, 58 are axially aligned with friction member 86 to allow engagement between cages 56, 58 and friction member 86 as described hereinbelow.

Rings 60, 62 provide a means for positioning and retaining springs 64, 66. Rings 60, 62 may comprise snap rings and are conventional in the art. Rings 60, 62 are disposed within grooves formed in cam discs 44, 46 proximate the outboard axial ends of discs 44, 46.

Springs 64, 66 provide a means for biasing cages 56, 58 into frictional engagement with faces 88, 90 of friction member 86. Springs 64, 66 may comprise wave springs or another conventional spring.

Referring to FIGS. 1-2, the operation of clutch 30 and assembly 10 will be described. Object 12 may be rolled upon rotational body 16. In order to transfer at least a portion of object 12 to body 14, motor 30 drives shaft 42 in one rotational direction. Movement of cage 56 is inhibited by its frictional engagement with member 86. The rotation of cam disc 44 causes rollers 52 to move along ramps 96 into engagement with outer race 48 resulting in torque transfer. Torque is transmitted through belt 32 and pulleys 36, 38 to rotational body 14 which pulls object 12 onto body 14. At the same time, movement of cage 58 is also inhibited by its frictional engagement with member 86. The rotation of cam disc 46 causes rollers 54 to move along ramps 98 out of engagement with outer race 50 and outer race 50 freewheels relative to disc 46. As a result, torque is not transmitted to race 50 or body 16. In order to return object 12 to its original position, motor 30 drives shaft 42 in the opposite rotational direction. This action causes rollers 54 to move along ramps 98 and into engagement with outer race 50 and creates a torque transmitting engagement between cam disc 46, rollers 54 and outer race 50. Torque is transmitted through race 50 to body 16 which pulls object 12 to its original position on body 16. At the same time, rollers 52 move along ramps 96 out of engagement with outer race 48 and outer race 48 freewheels relative to disc 44. As a result, torque is not transmitted to race 48 or body 14.

A clutch 34 in accordance with the present invention represents a significant improvement relative to conventional clutches. The inventive clutch is able to transfer an object 12 between multiple rotational bodies 14, 16 in either direction in response to torque provided by a single motor 30. As a result, a single motor 30 can be used in assemblies such as assembly 10, eliminating the need for multiple motors and reducing the cost and space requirements for such systems. Clutch 34 is also advantageous because the operation of the clutch is automatic and does not require external power. In particular, engagement and disengagement of the outer races 48, 50 of clutch 34 occurs without the need for an operator to manually shift the clutch 34. Further, the clutch operates without the need for electrical or fluid actuation enabling its use in applications where external power may be unavailable (e.g., window screen system during adverse weather conditions).

While the invention has been shown and described with reference to one or more particular embodiments thereof, it will be understood by those of skill in the art that various changes and modifications can be made without departing from the spirit and scope of the invention.

We claim:

1. A bi-directional overrunning clutch, comprising:
a housing;
a driven shaft extending into said housing and disposed about a rotational axis;
a first cam disc disposed about said driven shaft and defining a first inner race;
a first outer race disposed about said driven shaft radially outwardly from said first cam disc;
a first plurality of rollers disposed between said first cam disc and said first outer race;
a second cam disc disposed about said driven shaft and defining a second inner race, said second cam disc axially spaced from said first cam disc;
a second outer race disposed about said driven shaft radially outwardly from said second cam disc; and,
a second plurality of rollers disposed between said second cam disc and said second outer race;
wherein rotation of said driven shaft in a first rotational direction always causes rotation of said first outer race in said first rotational direction and freewheeling of said second outer race and rotation of said driven shaft in a second rotational direction, opposite said first rotational direction, always causes rotation of said second outer race in said second rotational direction and freewheeling of said first outer race.

2. The bi-directional overrunning clutch of claim 1 wherein said first cam disc and said second cam disc are a unitary structure.

3. The bi-directional overrunning clutch of claim 1 wherein said first cam disc defines a first plurality of ramps in engagement with said first plurality of rollers.

4. The bi-directional overrunning clutch of claim 1 wherein said housing is fixed against rotation.

5. A bi-directional overrunning clutch, comprising:
a housing;
a driven shaft extending into said housing and disposed about a rotational axis;
a first cam disc disposed about said driven shaft and defining a first inner race;
a first outer race disposed about said driven shaft radially outwardly from said first cam disc;
a first plurality of rollers disposed between said first cam disc and said first outer race;
a second cam disc disposed about said driven shaft and defining a second inner race, said second cam disc axially spaced from said first cam disc;
a second outer race disposed about said driven shaft radially outwardly from said second cam disc; and,
a second plurality of rollers disposed between said second cam disc and said second outer race;
wherein rotation of said driven shaft in a first rotational direction causes rotation of said first outer race in said first rotational direction and freewheeling of said second outer race and rotation of said driven shaft in a second rotational direction, opposite said first rotational direction, causes rotation of said second outer race in said second rotational direction and freewheeling of said first outer race
wherein said first cam disc defines a first plurality of ramps in engagement with said first plurality of rollers
wherein said second cam disc defines a second plurality of ramps in engagement with said second plurality of rollers, said second plurality of ramps having an opposite orientation relative to said first plurality of ramps.

6. A bi-directional overrunning clutch, comprising:
a housing, said housing including a friction member defining first and second friction faces;
a driven shaft extending into said housing and disposed about a rotational axis;
a first cam disc disposed about said driven shaft and defining a first inner race;
a first outer race disposed about said driven shaft radially outwardly from said first cam disc;
a first plurality of rollers disposed between said first cam disc and said first outer race;
a first cage disposed between said first cam disc and said first outer race, said first cage configured to house said first plurality of rollers and in engagement with said first friction face;
a second cam disc disposed about said driven shaft and defining a second inner race, said second cam disc axially spaced from said first cam disc;
a second outer race disposed about said driven shaft radially outwardly from said second cam disc; and,
a second plurality of rollers disposed between said second cam disc and said second outer race;
a second cage disposed between said second cam disc and said second outer race, said second cage configured to house said second plurality of rollers and in engagement with said second friction face
wherein rotation of said driven shaft in a first rotational direction causes rotation of said first outer race in said first rotational direction and freewheeling of said second outer race and rotation of said driven shaft in a second rotational direction, opposite said first rotational direction, causes rotation of said second outer race in said second rotational direction and freewheeling of said first outer race.

7. The bi-directional overrunning clutch of claim 6 wherein said friction member is disposed between said first and second cages.

8. The bi-directional overrunning clutch of claim 6 wherein said first cam disc and said second cam disc are a unitary structure.

9. The bi-directional overrunning clutch of claim 6 wherein said housing is fixed against rotation.

10. The bi-directional overrunning clutch of claim 6, further comprising:
a first spring biasing said first cage into engagement with said first friction face; and,
a second spring biasing said second cage into engagement with said second friction face.

11. The bi-directional overrunning clutch of claim 10, further comprising:
a first ring disposed within a groove in said first cam disc, said first spring disposed between said first ring and said first cage; and,
a second ring disposed within a groove in said second cam disc, said second spring disposed between said second ring and said second cage.

12. The bi-directional overrunning clutch of claim 6 wherein said first cam disc defines a first plurality of ramps in engagement with said first plurality of rollers.

13. The bi-directional overrunning clutch of claim 12 wherein said second cam disc defines a second plurality of ramps in engagement with said second plurality of rollers, said second plurality of ramps having an opposite orientation relative to said first plurality of ramps.

14. An assembly for moving an object between first and second rotational bodies to which said object is connected, comprising:
a belt;
a motor; and,
a bi-directional overrunning clutch having:
a housing;
a driven shaft extending into said housing and disposed about a rotational axis, said driven shaft rotating responsive to said motor;
a first cam disc disposed about said driven shaft and defining a first inner race;
a first outer race disposed about said driven shaft radially outwardly from said first cam disc, said belt coupled to said first outer race and said first rotational body;
a first plurality of rollers disposed between said first cam disc and said first outer race;
a second cam disc disposed about said driven shaft and defining a second inner race, said second cam disc axially spaced from said first cam disc;
a second outer race disposed about said driven shaft radially outwardly from said second cam disc and coupled to said second rotational body; and,
a second plurality of rollers disposed between said second cam disc and said second outer race;
wherein rotation of said driven shaft in a first rotational direction causes rotation of said first outer race in said first rotational direction and freewheeling of said second outer race and rotation of said driven shaft in a second rotational direction, opposite said first rotational direction, causes rotation of said second outer race in said second rotational direction and freewheeling of said first outer race.

15. The assembly of claim 14 wherein said housing is fixed against rotation.

16. The assembly of claim 14 wherein said first cam disc and said second cam disc are unitary in construction.

17. The assembly of claim 14 wherein rotation of said driven shaft in said first rotational direction always causes rotation of said first outer race in said first rotational direction and freewheeling of said second outer race and rotation of said driven shaft in said second rotational direction, opposite said first rotational direction, always causes rotation of said second outer race in said second rotational direction and freewheeling of said first outer race.

18. The assembly of claim 14 wherein said bi-directional overrunning clutch includes:
a first cage disposed between said first cam disc and said first outer race, said first cage configured to house said first plurality of rollers; and
a second cage disposed between said second cam disc and said second outer race, said second cage configured to house said second plurality of rollers;
said housing including a friction member defining first and second friction faces, said first cage in engagement with said first friction face and said second cage in engagement with said second friction face.

19. The assembly of claim 18 wherein said friction member is disposed between said first and second cages.

20. The assembly of claim 18, further comprising:
a first spring biasing said first cage into engagement with said first friction face; and,
a second spring biasing said second cage into engagement with said second friction face.

21. The assembly of claim 20, further comprising:
a first ring disposed within a groove in said first cam disc, said first spring disposed between said first ring and said first cage; and,
a second ring disposed within a groove in said second cam disc, said second spring disposed between said second ring and said second cage.

* * * * *